(12) United States Patent
Rofougaran

(10) Patent No.: US 7,809,049 B2
(45) Date of Patent: Oct. 5, 2010

(54) VOICE DATA RF IMAGE AND/OR VIDEO IC

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 819 days.

(21) Appl. No.: 11/711,125

(22) Filed: Feb. 26, 2007

(65) Prior Publication Data

US 2008/0075154 A1 Mar. 27, 2008

Related U.S. Application Data

(63) Continuation-in-part of application No. 11/513,588, filed on Aug. 31, 2006, and a continuation-in-part of application No. 11/641,999, filed on Dec. 19, 2006.

(51) Int. Cl.
*H04B 1/38* (2006.01)
*H04L 5/16* (2006.01)

(52) U.S. Cl. ............... 375/222; 375/219; 375/220; 375/295; 375/316; 379/88.13; 370/314; 370/345; 370/435; 455/553.1; 455/466; 455/446

(58) Field of Classification Search ............ 375/222, 375/219, 220, 295, 316; 379/88.13; 370/314, 370/345, 435; 455/553.1, 466, 446
See application file for complete search history.

(56) References Cited

U.S. PATENT DOCUMENTS 7,069,211 B2 *  6/2006  Chiu et al. ............... 704/221

2002/0097846 A1 * 7/2002 Jung ................ 379/88.13
2008/0123580 A1 * 5/2008 Vathulya ................ 370/314

OTHER PUBLICATIONS

GSM "LoCosto", Texas Instruments, Technology for Innovators, pp. 1-2.
Edge/GPRS/GSM Single-Chip Multimedia Baseband Processor, BCM2133, Product Brief, Broadcom Corporation, 2133-PB07-D1, Nov. 30, 2006, pp. 1-2.

(Continued)

*Primary Examiner*—Phuong Phu
(74) *Attorney, Agent, or Firm*—Garlick Harrison & Markison; Timothy W. Markison; Shayne X. Short

(57) ABSTRACT

An integrated circuit includes a baseband processing module, an RF section, and an interface module. The baseband processing module converts an outbound voice signal into an outbound voice symbol stream; converts an inbound voice symbol stream into an inbound voice signal; converts outbound data into an outbound data symbol stream; converts an inbound data symbol stream into inbound data; converts outbound image/video data into an outbound image/video symbol stream; and converts an inbound image/video symbol stream into inbound image/video data. The RF section converts an inbound RF voice signal into the inbound voice symbol stream; converts the outbound voice symbol stream into an outbound RF voice signal; converts an inbound RF data signal into the inbound data symbol stream; converts the outbound data symbol stream into an outbound RF data signal; converts an inbound RF image/video signal into the inbound image/video symbol stream; and converts the outbound image/video symbol stream into an outbound RF image/video signal. The interface module couples the baseband processing module to the RF section.

20 Claims, 9 Drawing Sheets

OTHER PUBLICATIONS

WCDMA Baseband Coprocessor, BCM2141, Product Brief, Broadcom Corporation, 2141-PB03-R, Dec. 1, 2006, pp. 1-2.
Hedge Single-Chip Multimedia Baseband Processor, BCM2152, Product Brief, Broadcom Corporation, 2152-PB04-R, Dec. 1, 2006, pp. 1-2.

Andrew Fogg: DigRF Baseband/RF Digital Interface Specification; Logical, Electrical and Timing Characteristics, EGPRS Version, Digital Interface Working Group, version 1.12, pp. 1-32.
Molecular Expressions Optical Microscopy Primer: Digital Imaging in Optical Microscopy, pp. 1-13.

* cited by examiner

VOICE DATA RF IMAGE AND/OR VIDEO IC

This patent application is claiming priority under 35 USC §120 as a continuation-in-part patent application of co-pending patent application entitled RFIC WITH ON-CHIP ACOUSTIC TRANSDUCER CIRCUIT, having a filing date of Aug. 31, 2006, and a Ser. No. 11/513,588 and as a continuation-in-part patent application of co-pending patent application entitled VOICE/DATA/RF INTEGRATED CIRCUIT, having a filing date of Dec. 19, 2006, and a serial number of 11/641,999.

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. In addition, the desire to have wireless communication devices perform multiple functions such as data communications, voice communications, image capture, image display, etc. is also increasing the desire for further integration. However, such desires have gone unrealized when it comes to implementing baseband and RF on the same chip for multiple wireless communication standards with other functions such as image capture and image display.

Therefore, a need exists for an integrated circuit (IC) that implements baseband and RF of multiple wireless communication standards on the same IC die as other functions such as image capture and/or image display.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
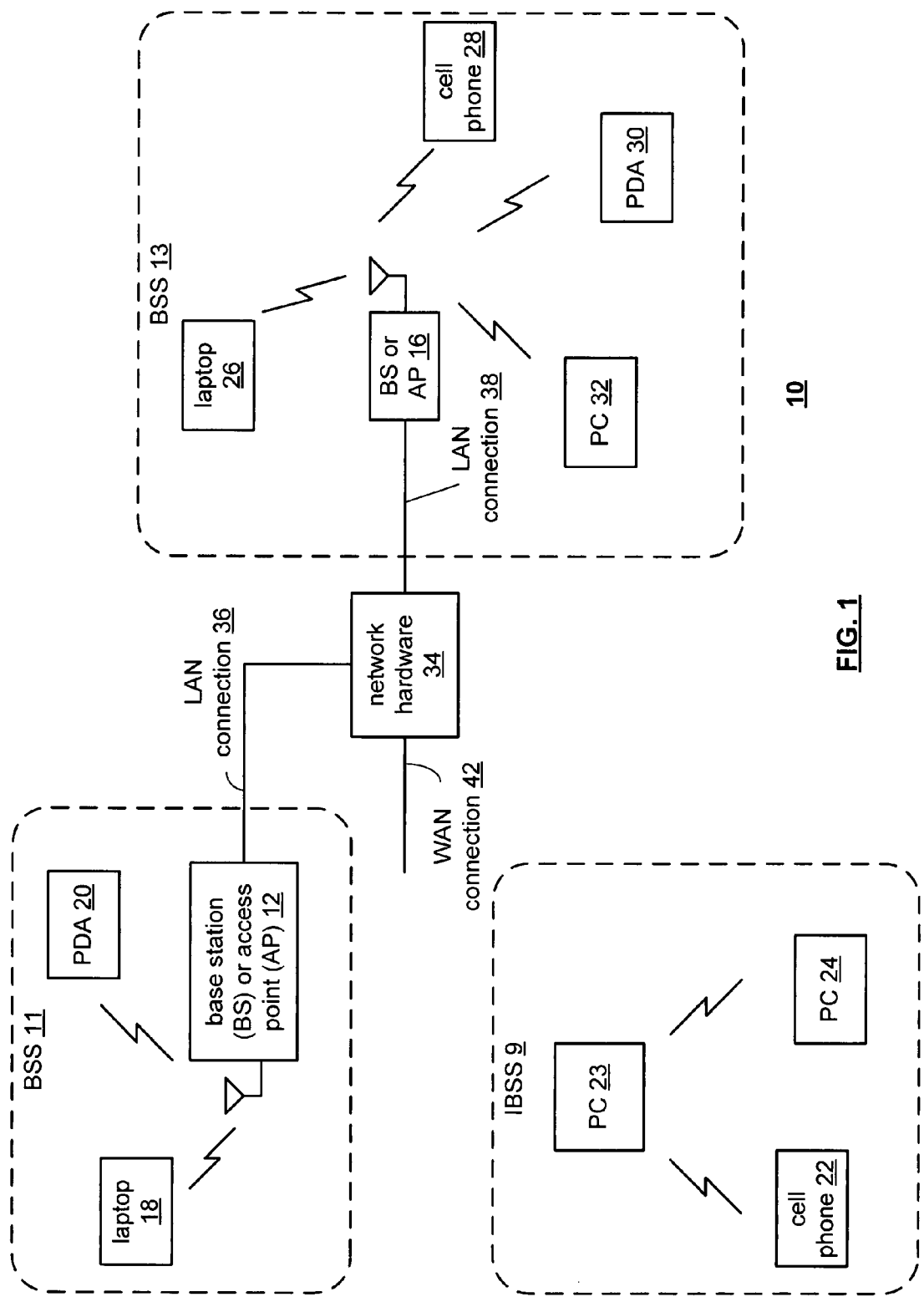
FIG. 1 is a schematic block diagram of an embodiment of a wireless communication system in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11 (g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 2:
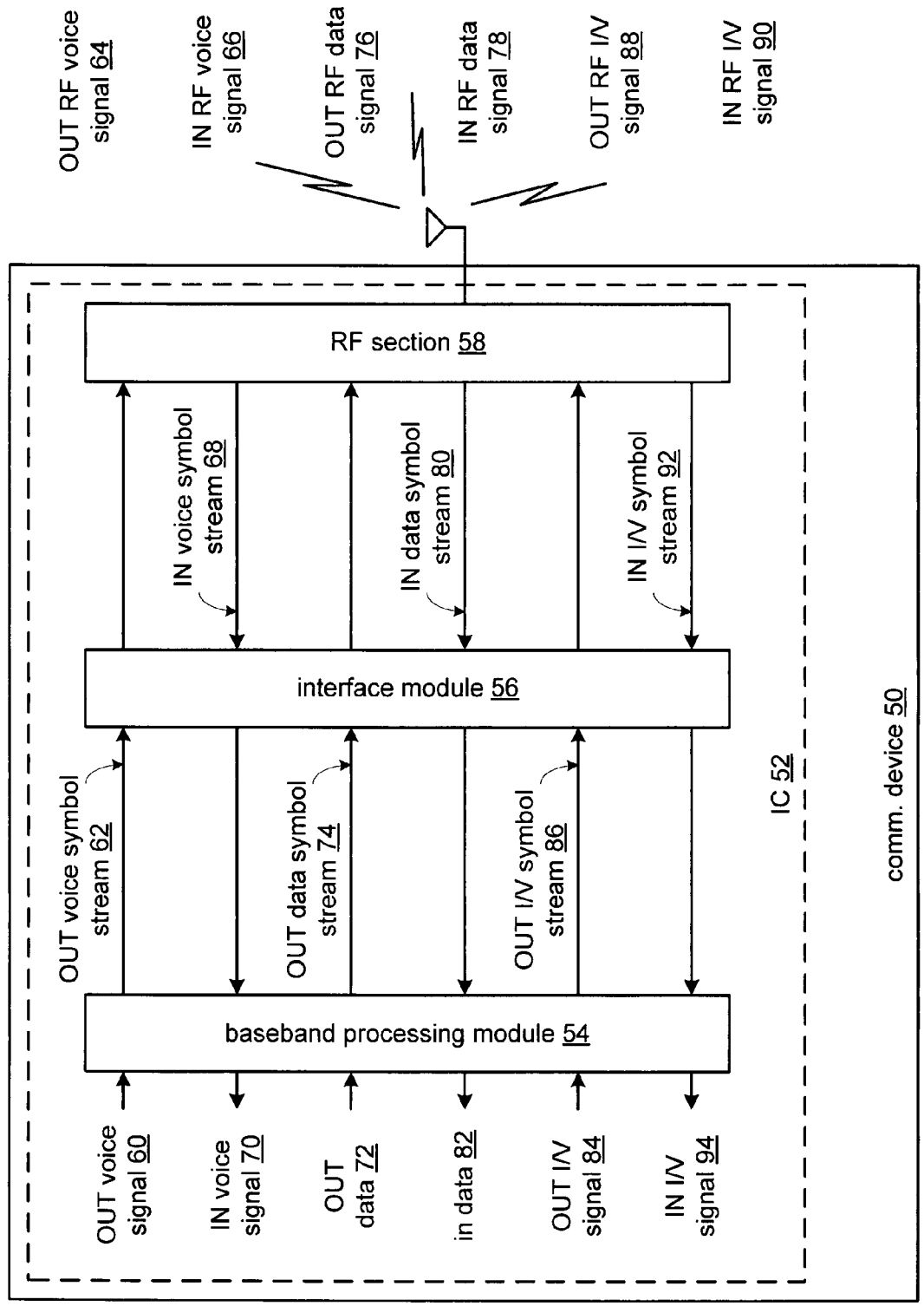
FIG. 2 is a schematic block diagram of an embodiment of a communication device in accordance with the present invention.

FIG. 2 is a schematic block diagram of an embodiment of a communication device 50 that includes an integrated circuit (IC) 52. The communication device 50 may be one of the communication devices 18-32 of FIG. 1 or another type of communication device to transceive cellular voice communications, cellular data communications, and/or image and/or video (I/V) communications.

The IC 52 includes a baseband processing module 54, an interface module 56, and an RF section 58. The baseband processing module 54 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 54 may have an associated memory and/or memory element, which may be a single memory device, a plurality of memory devices, and/or embedded circuitry of the processing module 54. Such a memory device may be a read-only memory, random access memory, volatile memory, non-volatile memory, static memory, dynamic memory, flash memory, cache memory, and/or any device that stores digital information. Note that when the processing module 54 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 54 executes, hard coded and/or operational instructions corresponding to at least some of the steps and/or functions illustrated in FIGS. 2-9.

The baseband processing module 54 is coupled to convert an outbound voice signal 60 into an outbound voice symbol stream 62 and to convert an inbound voice symbol stream 68 into an inbound voice signal 70 in accordance with one or more cellular voice communication standards (e.g., GSM, CDMA, WCDMA, AMPS, etc.). The baseband processing module is also coupled to convert outbound data 72 into an outbound data symbol stream 74 and to convert an inbound data symbol stream 80 into inbound data 82 in accordance with one or more cellular data communication standards (e.g., EDGE, GPRS, etc.).

The baseband processing module 54 is further coupled to convert outbound image/video (I/V) data 84 into an outbound image/video symbol stream 86 and to convert an inbound image/video symbol stream 92 into inbound image/video data 94. This may be done in accordance with a cellular voice communication standard, a wireless network communication standard (e.g., IEEE802.11, Bluetooth, ZigBee, etc.), a broadcast television standard (e.g., SDTV, HDTV, NTSC, PAL, PAL2, SECAM, etc.), a satellite standard, and/or any other standard that regulates the transmission and subsequent reception of public programs. The inbound and outbound image/video signals 84 and/or 94 may be uncompressed still images, compressed still images (e.g., [joint picture expert group] JPEG image file), uncompressed video, and/or compressed video (e.g., [motion picture expert group] MPEG video) that may be captured via an image and/or video capture device on the IC 52 and/or within the communication device 50 and/or that may be a stored file within memory of the IC 52 and/or the communication device 50.

The RF section 58 (embodiment of which will be described in greater detail with reference to FIGS. 3 and 4) is coupled to convert an inbound RF voice signal 66 into the inbound voice symbol stream 68, convert the outbound voice symbol stream 62 into an outbound RF voice signal 64, convert an inbound RF data signal 78 into the inbound data symbol stream 80, convert the outbound data symbol stream 74 into an outbound RF data signal 76, convert an inbound RF image/video signal 90 into the inbound image/video symbol stream 92, and convert the outbound image/video symbol stream 86 into an outbound RF image/video signal 88.

The interface module 56, which may be implemented as described in co-pending patent application entitled VOICE/DATA/RF INTEGRATED CIRCUIT, having a filing date of Dec. 19, 2006, and a Ser. No. 11/641,999, is coupled to convey the inbound voice symbol stream 68 and the outbound voice symbol stream 62 between the baseband processing module 54 and the RF section 58; convey the inbound data symbol stream 80 and the outbound data symbol stream 74 between the baseband processing module 54 and the RF section 58; and convey the inbound image/video symbol stream 92 and the outbound image/video symbol stream 86 between the baseband processing module 54 and the RF section 58. Note that the inbound RF image/video signal may include one or more of a very high frequency (VHF) television broadcast signal, a ultra high frequency (UHF) television broadcast signal, a C-band satellite broadcast signal, and a K-band satellite broadcast signal.

Figure 3:
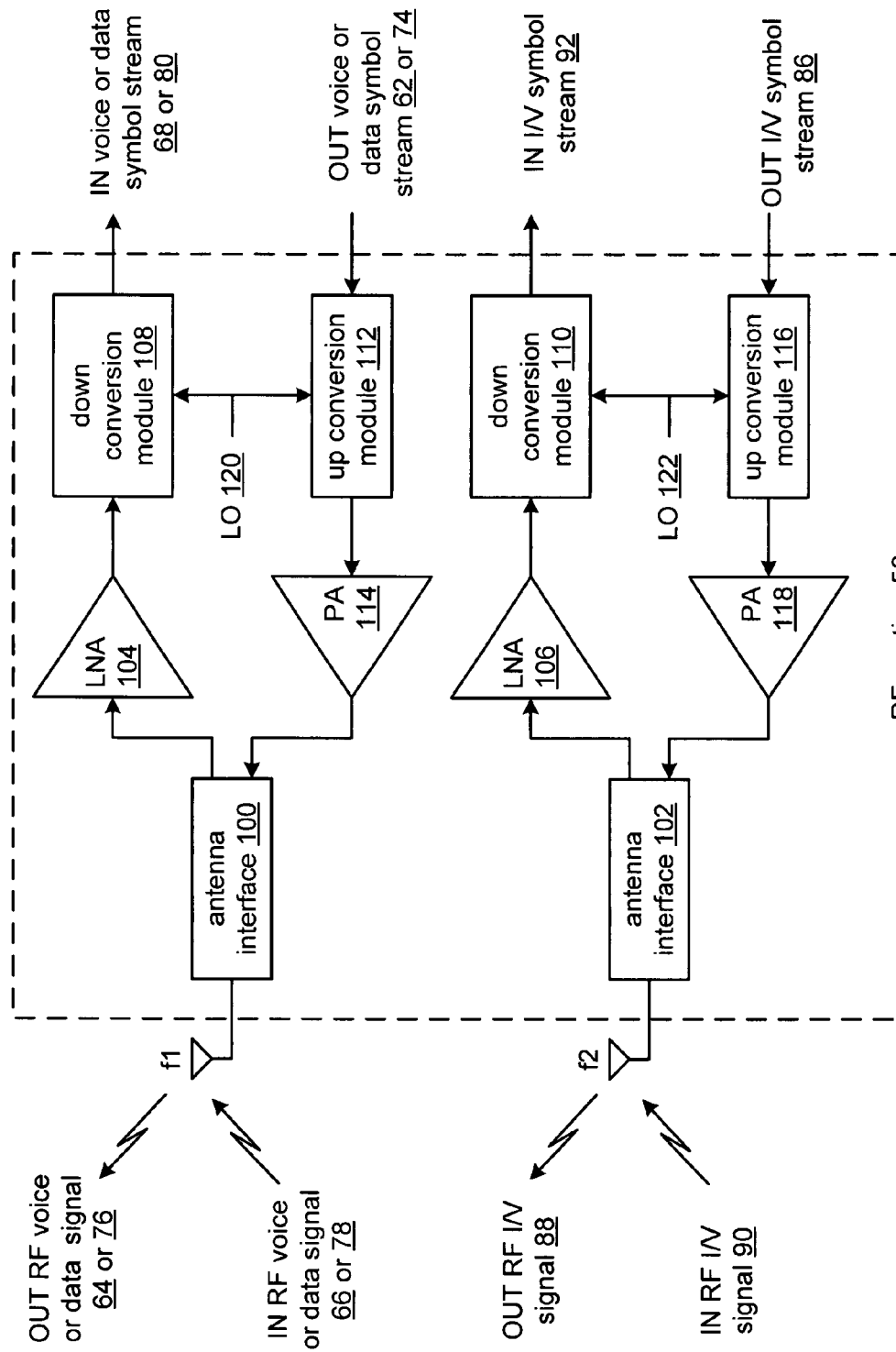
FIG. 3 is a schematic block diagram of an embodiment of a radio frequency (RF) section in accordance with the present invention.

FIG. 3 is a schematic block diagram of an embodiment of the RF section 58 that includes first and second antenna interfaces 100 and 102, first and second low noise amplifier (LNA) modules 104 and 106, first and second down conversion modules 108 and 110, first and second up-conversion modules 112 and 114, and first and second power amplifier (PA) modules 118.

The first antenna interface 100, which may include a transformer balun, a transmit/receive switch, an impedance matching circuit, and/or a transmission line, is coupled to a first antenna structure that transceives the inbound and outbound RF voice signals 64 and 66 and/or the inbound and outbound RF data signals 76 and 78 in a first frequency band. The first antenna structure includes one or more antennas that are operable in the first frequency band and are arranged in a diversity pattern, in an orthogonal pattern, as an array, in a polarization pattern, and/or in a combination thereof.

The second antenna interface 102, which may include a transformer balun, a transmit/receive switch, an impedance matching circuit, and/or a transmission line, is coupled to a second antenna structure that transceives the inbound and outbound RF image and/or video signals 88 and 90 in a second frequency band. The second antenna structure includes one or more antennas that are operable in the first frequency band and are arranged in a diversity pattern, in an orthogonal pattern, as an array, in a polarization pattern, and/or or in a combination thereof.

As an example of the first and second frequency bands, assume that the image/video signals 88 and 90 are generated in accordance with an IEEE802.11 standard such that the second frequency band corresponds to the 2.4 GHz frequency band (e.g., 2.412-2.483 GHz) and/or the 5 GHz frequency band (e.g., 5.15-5.35 GHz and 5.725-5.825 GHz). Further assume that the voice signals 64 and 66 are generated in accordance with frequency division duplex (FDD) WCDMA such that the first frequency band corresponds to a 1900 MHz and 2100 MHz frequency bands (e.g., 1920-1980 MHz for uplink communications and 2110-2170 MHz for downlink communications). As another example, assume that the voice signals 64 and 66 are generated in accordance with time division duplex (TDD) WCDMA such that the first frequency band corresponds to the 1900 and 2100 MHz frequency bands (e.g., 1900-1920 MHz and 2010-2025 MHz, which are shared by the uplink and downlink communications).

As yet another example, assume that the image and/or video signals 88 and 90 are generated in accordance with a VHF television standard such that the second frequency band corresponds to a 30-300 MHz frequency band, a UHF television standard such that the second frequency band corresponds to a 300 MHz to 3 GHz frequency band, a satellite standard in the C-band such that the second frequency band is 500 MHz to 1 GHz, or a satellite standard in the K-band such that the second frequency band is 12 GHz to 18 GHz.

As a further example, assume that the voice signals 64 and 66 are generated in accordance with a GSM standard such that the second frequency band corresponds to a 900 MHz frequency band (e.g., 880-915 MHz and 925-960 MHz), an 1800 MHz frequency band (e.g., 1710-1785 MHz and 1805-1880 MHz), and/or a 1900 MHz frequency band (e.g., 1850-1910 MHz and 1930-1990 MHz). As yet a further example, assume that the data signals 76 and 78 are generated in accordance with an EDGE standard such that the second frequency band corresponds to the 900 MHz, 1800 MHz, and/or 1900 MHz frequency bands. As still another example, assume that the data signals 76 and 78 are generated in accordance with a GPRS standard such that the second frequency band corresponds to the 900 MHz, 1800 MHz, and/or 1900 MHz frequency bands.

The first low noise amplifier module 104, which includes one or more low noise amplifiers coupled in series, in parallel, or a combination thereof, is coupled to amplify the inbound RF voice signal 64 or the inbound RF data signal 78 to produce an amplified inbound RF voice or data signal. The first down conversion module 108, which may include one or more mixers, a bandpass filter or a low pass filter, is coupled to convert the amplified inbound RF voice or data signal into the inbound voice or data symbol stream 68 or 80 in accordance with a first local oscillation 120. For example, for a direct conversion down converter, the first local oscillation 120 corresponds to the carrier frequency of the inbound RF voice or data signal 64 or 78, which is mixed with the amplified inbound RF voice or data signal to produce a mixed signal (two mixed signals if the amplified inbound RF voice or data signal includes in-phase and quadrature components) that is filtered by the bandpass or low pass filter to produce the inbound voice or data symbol stream 68 or 80.

The first up conversion module 112, which includes one or more mixers and a bandpass filter, is coupled to convert the outbound voice symbol stream 62 or the outbound data symbol stream 74 into an up-converted voice or data signal in accordance with the first local oscillation 120. In an embodiment, the first local oscillation 120 is generated by a phase locked loop that is modulated in accordance with the outbound voice or data symbol stream 62 or 74 and filtered to produce the up-converted voice or data signal. In another embodiment, an in-phase component of the first local oscillation 120 is mixed with an in-phase component of the outbound voice or data symbol stream 62 or 74 to produce a first mixed signal and a quadrature component of the first local oscillation 120 is mixed with a quadrature component of the outbound voice or data symbol stream 62 or 74 to produce a second mixed signal, where the first and second mixed signals are combined and filtered to produce the up-converted voice or data signal.

The first power amplifier module 114, which includes one or more power amplifiers and/or one or more power amplifier drivers coupled in series and/or in parallel, is coupled to amplify the up-converted voice or data signal to produce the outbound RF voice signal 66 or the outbound RF data signal 78. The first PA module 114 provides the outbound RF voice or data signal 66 or 78 to the first antenna interface 100 for transmission via the first antenna structure. Note that the first PA module 114 may amplify the up-converted data signal in accordance with amplitude modulation information when the outbound data symbol stream 74 includes the amplitude modulation information.

The second low noise amplifier module 106, which includes one or more low noise amplifiers coupled in series, in parallel, or a combination thereof, is coupled to amplify the inbound RF image and/or video signal 90 to produce an amplified inbound RF image and/or video signal. The second down conversion module 110, which may include one or more mixers, a bandpass filter or a low pass filter, is coupled to convert the amplified inbound RF image and/or video signal into the inbound image and/or video data symbol stream 92 in accordance with a second local oscillation 122. For example, for a direct conversion down converter, the second local oscillation 122 corresponds to the carrier frequency of the inbound RF image and/or video signal 90, which is mixed with the amplified inbound RF image and/or video signal to produce a mixed signal (two mixed signals if the amplified inbound RF image and/or video signal includes in-phase and quadrature components) that is filtered by the bandpass or low pass filter to produce the inbound image and/or video symbol stream 92.

The second up conversion module 116, which includes one or more mixers and a bandpass filter, is coupled to convert the outbound image and/or video symbol stream 86 into an up-converted image and/or video signal in accordance with the second local oscillation 122. In an embodiment, the second local oscillation 122 is generated by a phase locked loop that is modulated in accordance with the outbound image and/or video symbol stream 86 and filtered to produce the up-converted image and/or video signal. In another embodiment, an in-phase component of the second local oscillation 122 is mixed with an in-phase component of the outbound image and/or video symbol stream 86 to produce a first mixed signal and a quadrature component of the second local oscillation 122 is mixed with a quadrature component of the outbound image and/or video symbol stream 86 to produce a second mixed signal, where the first and second mixed signals are combined and filtered to produce the up-converted image and/or video signal.

The second power amplifier module 118, which includes one or more power amplifiers and/or one or more power amplifier drivers coupled in series and/or in parallel, is coupled to amplify the up-converted image and/or video signal to produce the outbound RF image and/or video signal 88. The second PA module 118 provides the outbound RF image and/or video signal 88 to the second antenna interface 102 for transmission via the second antenna structure. Note that the second PA module 118 may amplify the up-converted image and/or video signal in accordance with amplitude modulation information when the outbound image and/or video symbol stream 86 includes the amplitude modulation information. Such an embodiment enables, if desired, a cellular voice communication to occur simultaneously with an image and/or video communication.

Figure 4:
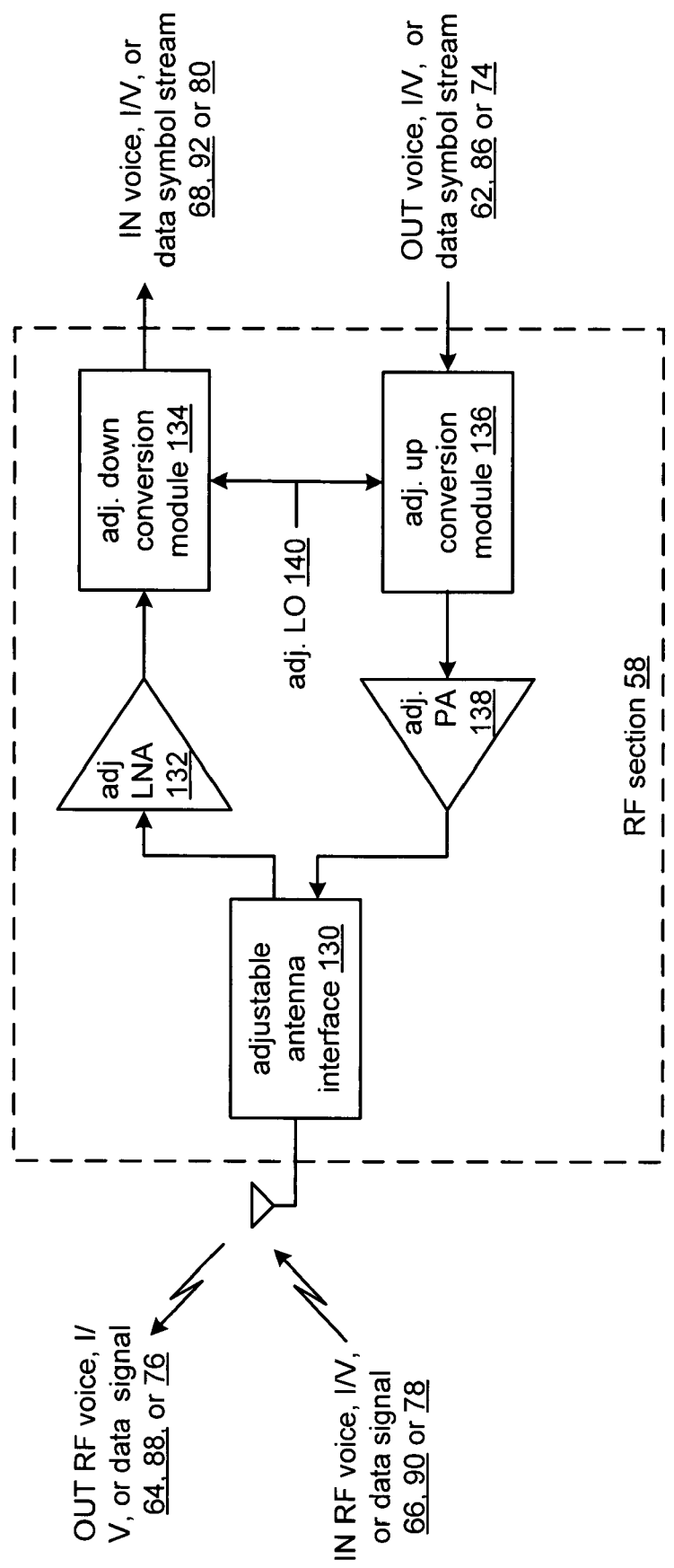
FIG. 4 is a schematic block diagram of another embodiment of a radio frequency (RF) section in accordance with the present invention.

FIG. 4 is a schematic block diagram of another embodiment of the RF section 58 that includes an adjustable antenna interface 130, an adjustable LNA module 132, an adjustable down conversion module 134, and adjustable up-conversion module 136, and an adjustable PA module 138. In this embodiment, the components 130-138 are adjusted to accommodate the different frequency bands that the inbound and outbound voice, data, and/or image/video signals may use. In general, the bandwidth, frequency response, impedance, and/or other characteristics of the components 130-138 is/are tuned in accordance with the desired frequency band. For instance, the frequency band may be 30-300 MHz, 300-3,000 MHz, 500-1,000 MHz, 900 MHz, 1800 MHz, 1900 MHz, 2100 MHz, 2.4 GHz, 5 GHz, 12-18 GHz, etc.

In the present embodiment, the adjustable antenna interface 130 is coupled to an array of antennas (e.g., one or more antennas for each frequency band and/or adjustable antennas tunable to the desired frequency band). The array of antennas transceives the inbound and outbound RF voice signals 64 and 66, the inbound and outbound RF data signals 76 and 78, and the inbound and outbound RF image/video signals 88 and 90 in different frequency bands. For example, the inbound and outbound RF voices signals 64 and 66 may be transceived in the 1800 or 1900 MHz frequency band (e.g., GSM signals), the inbound and outbound data signals 76 and 78 may be transceived in the 1800 or 1900 MHz frequency band (e.g., EDGE or GPRS), and the inbound and outbound RF image and/or video signals 88 and 90 may be transceived in the 2.4 GHz frequency band (e.g., WLAN or wireless personal area network). Alternatively, the inbound and outbound RF image and/or video signals 88 and 90 may be transceived in the 30-300 MHz frequency band (e.g., VHF), 300-3,000 MHz frequency band (e.g., UHF), 500-1,000 MHz frequency band (e.g., satellite C-band), 1800 MHz or 1900 MHz (e.g., EDGE or GPRS), and/or 12-18 GHz frequency band (e.g., satellite K-band). The adjustable antenna interface 130 adjusts it impedance, frequency response, and/or bandwidth to accommodate the particular inbound and outbound RF signals 64 and 66, 76 and 78, and 88 and 90.

The adjustable low noise amplifier module 132, which includes one or more low noise amplifiers coupled in series and/or in parallel, is adjusted (e.g., adjust frequency response, gain, bandwidth, impedance, etc.) to amplify the inbound RF voice signal 66, the inbound RF data signal 78, or the inbound RF image/video signal 90 to produce an amplified inbound RF signal. The adjustable down conversion module 134, which includes one or more mixes and filters, is adjusted to convert the amplified inbound RF signal into the inbound data symbol stream 80, the inbound voice symbol stream 68, or the inbound image/video symbol stream 92 in accordance with an adjustable local oscillation 140. The adjustable local oscillation 140, which may include a phase locked loop, is adjusted such that its output oscillation (e.g., the local oscillation) corresponds to the carrier frequency of the inbound RF signals 66, 78, or 90.

The adjustable up conversion module 136 is adjusted to convert the outbound voice symbol stream 62, the outbound data symbol stream 74, or the outbound image/video symbol stream 86 into an up-converted signal in accordance with the adjustable local oscillation 140. The adjustable power amplifier module 138, which includes one or more power amplifier drivers and/or power amplifiers coupled in series and/or in parallel, is adjusted (e.g., adjust frequency response, gain, bandwidth, impedance, etc.) to amplify the up-converted signal to produce the outbound RF voice signal 64, the outbound RF data signal 76, or the outbound RF image/video signal 88.

Figure 5:
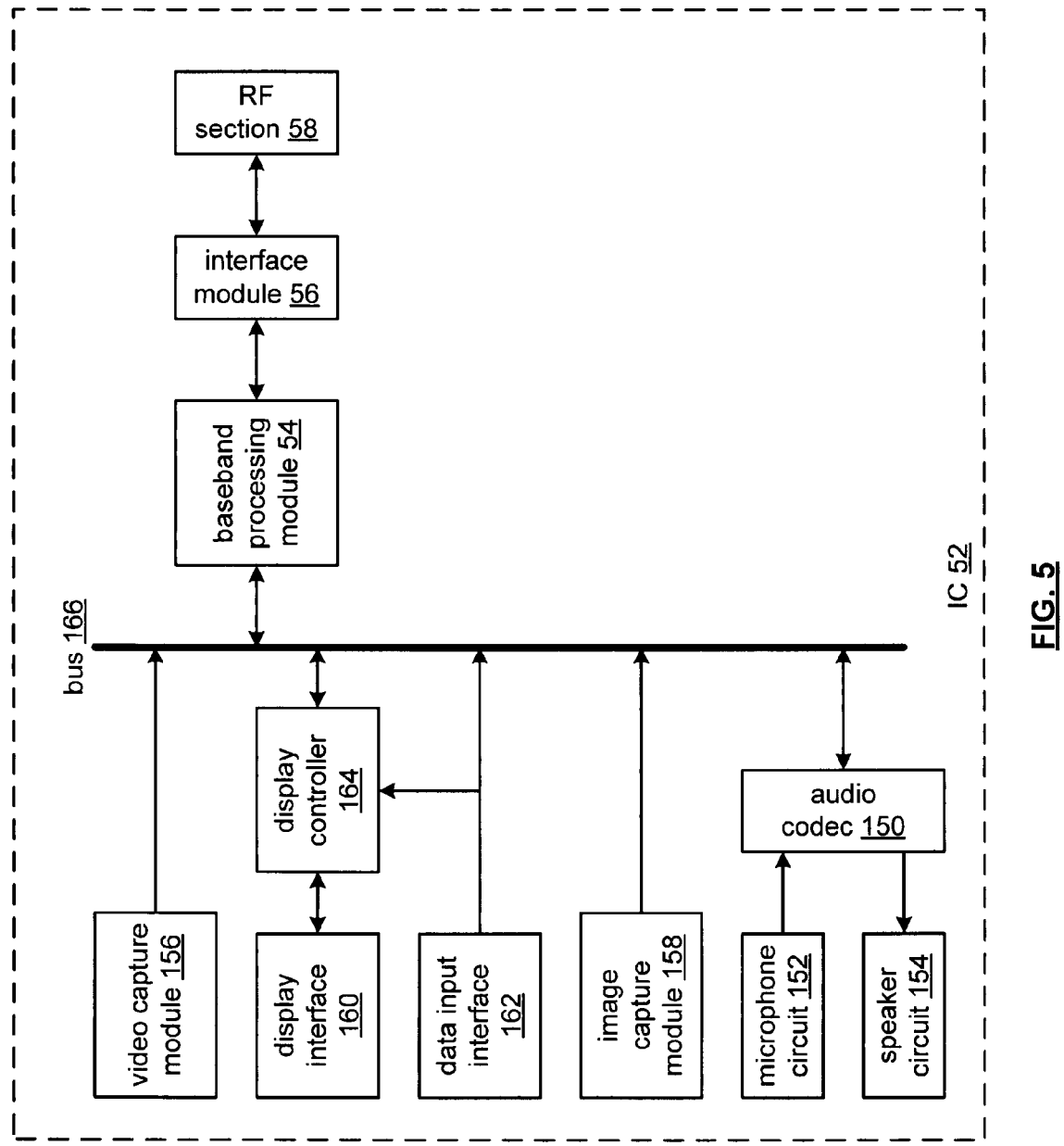
FIG. 5 is a schematic block diagram of another embodiment of an integrated circuit in accordance with the present invention.

FIG. 5 is a schematic block diagram of another embodiment of the integrated circuit 52 that includes the baseband processing module 54, the interface module 56, the RF section 58, a bus structure 166, an audio codec 150, a microphone circuit 152, a speaker circuit 154, a video capture module 156, an image capture module 158, a display interface 160, a data input interface 162, and a display controller 164. The audio codec 150 is coupled to convert an outbound analog signal into the outbound voice signal 60 and to convert the inbound voice signal 70 into an inbound analog signal. The microphone circuit block 152, which may include an interface to an off-chip microphone or an on-chip microphone transducer and biasing circuitry, is coupled to generate the outbound analog signal from received audio vibrations and to provide the outbound analog signals to the audio codec 150. The speaker circuit block 154, which may include an interface to an off-chip speaker or an on-chip speaker transducer and biasing circuitry, is coupled to render the inbound analog signal audible.

The video capture module 156, which may be an interface to an off-chip camcorder or an on-chip photo diode array and corresponding digital circuitry, is coupled provides an outbound video signal to the baseband processing module 54. The image capture module 158, which may be an interface to an off-chip image sensor or an on-chip image sensing photo diode array, is coupled to provide an outbound image signal to the baseband processing module 54.

The display interface 160 is coupled to provide at least one of the inbound image/video signal 94, the outbound image/video signal 84, the outbound data signal 72, and/or the inbound data signal 82 to a display. The display may be a LCD display, DLP display, and/or a plasma display. The data input interface 162 is coupled to provide the outbound data signal 72 from a data input circuit (e.g., keypad, keyboard, touch screen, touch knob, etc., to the baseband processing module 54. The display controller 164 is coupled to the baseband processing module 54 and to the display interface 160 to control displaying of the inbound image/video signal 94, the outbound image/video signal 84, the outbound data signal 72, and/or the inbound data signal 82 on the display.

Figure 6:
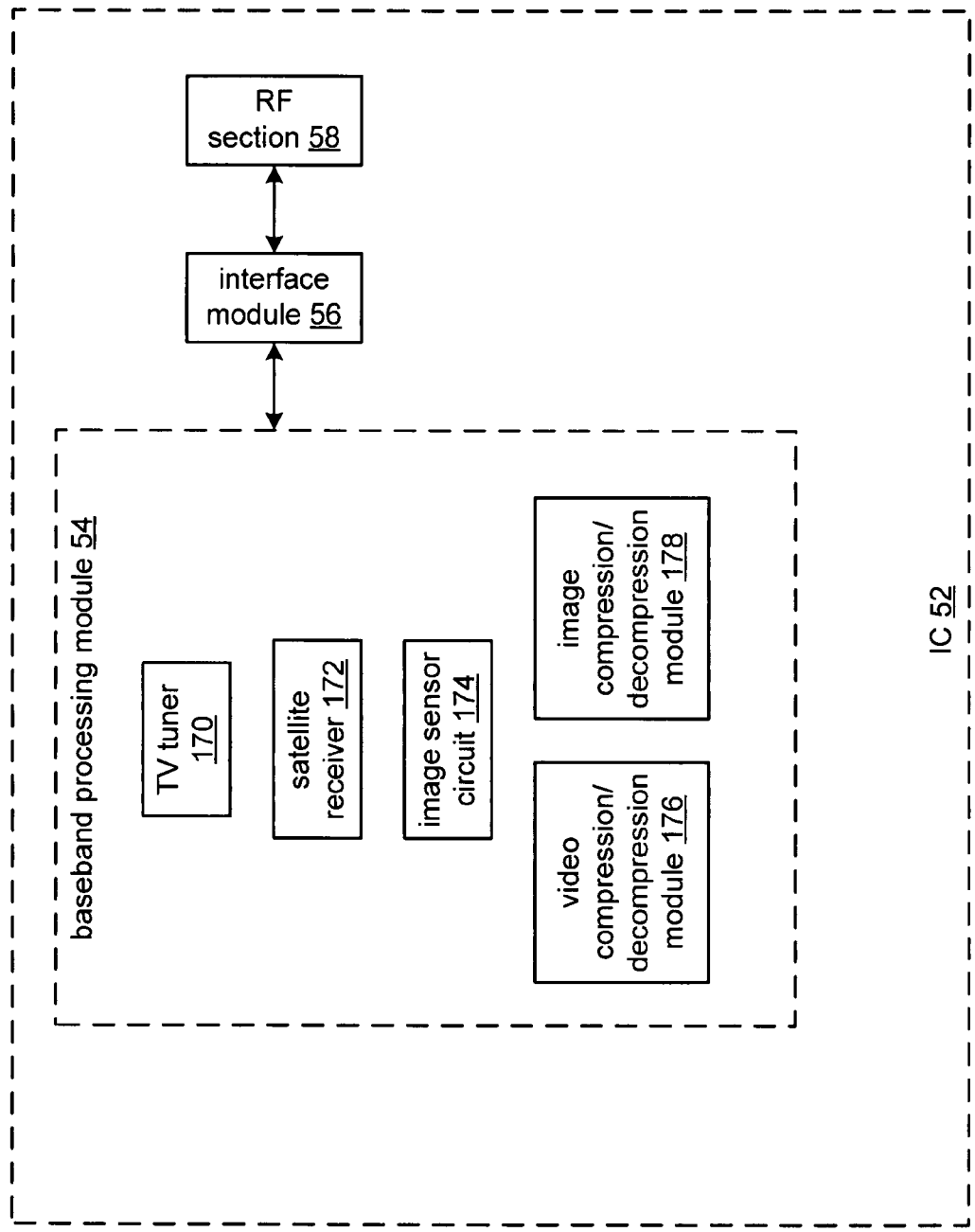
FIG. 6 is a schematic block diagram of another embodiment of an integrated circuit in accordance with the present invention.

FIG. 6 is a schematic block diagram of another embodiment of the integrated circuit 52 that includes the baseband processing module 54, the interface module 56, and the RF section 58. In this embodiment, the baseband processing module 54 includes one or more of a television tuner circuit 170, a satellite receiver circuit module 172, an image sensor circuit 174, a video compression/decompression module 176, and an image compression/decompression module 178.

The television tuner circuit module 170, which may be an HDTV tuner, an SDTV tuner, a PAL tuner, an NTSC tuner, and/or a SECAM tuner, is coupled to process the inbound image/video symbol stream 94 into an inbound television image/video signal. The television tuner circuit module 170 provides the inbound television image/video signal to the display controller 164 for subsequent presentation on the display. The satellite receiver circuit module 172 is coupled to process the inbound image/video symbol stream 94 into an inbound satellite image/video signal that is subsequently provided for display.

The image sensor circuit module 174, which may be digital camera circuitry, is coupled to convert a captured image into the outbound image/video signal 84. The video compression/decompression module 174, which may be an MPEG encoder/decoder, is coupled to compress an outbound video signal of the outbound image/video signal 84 and to decompress an inbound video signal of the inbound image/video signal 94. The image compression/decompression module 178, which may be a JPEG encoder/decoder, is coupled to compress an outbound image signal of the outbound image/video signal 84 and to decompress an inbound image signal of the inbound image/video signal 94.

Figure 7:
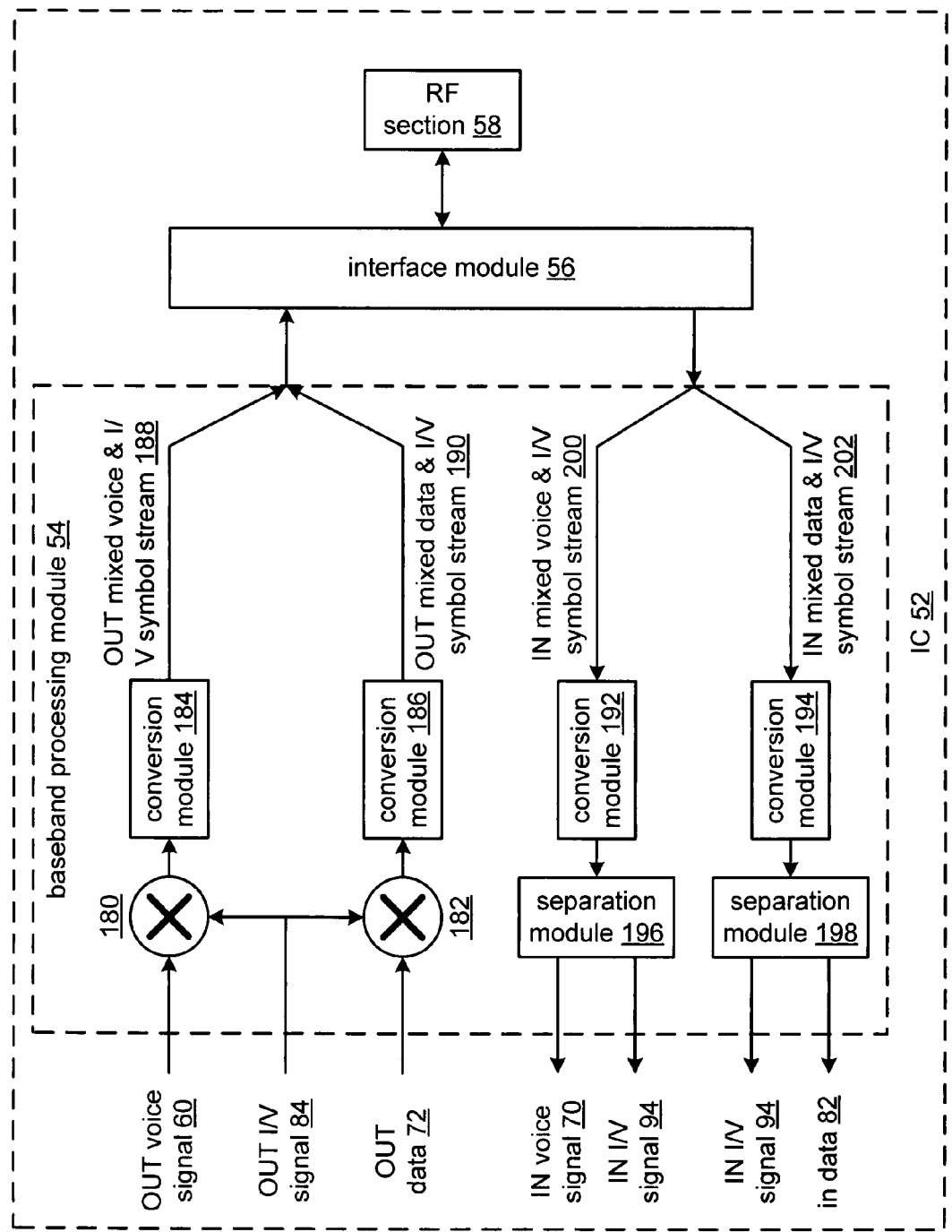
FIG. 7 is a schematic block diagram of another embodiment of an integrated circuit in accordance with the present invention.

FIG. 7 is a schematic block diagram of another embodiment of the integrated circuit 52 that includes the baseband processing module 54, the interface module 56, and the RF section 58. In this embodiment, the baseband processing module 54 includes mixers 180 and 192, conversion modules 184 and 186, conversion modules 192 and 194, and separation modules 196 and 198.

In one operational mode, the mixer 180 mixes the outbound voice signal 60 with the outbound image/video signal 84 to produce a mixed outbound voice and image/video signal. For example, the user may record a voice message to accompany an outbound photograph. As another example, the voice signal 60 may accompany a video signal that is being recorded. The conversion module 184 is coupled to convert the mixed outbound voice and image/video signal into a mixed outbound voice and image/video symbol stream 188. The conversion module 184 may perform one or more of scrambling, encoding, puncturing, interleaving, data modulation (e.g., QAM, QPSK, 8-PSK, GMSK, FSK, etc.), domain conversion, and/or filtering to produce the mixed outbound voice and image/video symbol stream 188.

In another operational mode, the mixer 182 mixes the outbound data signal 72 with the outbound image/video signal 84 to produce a mixed outbound data and image/video signal. For example, the user may prepare a text message and/or a graphics message to accompany an image and/or a video file. The conversion module 186 converts the mixed outbound data and image/video signal into a mixed outbound data and image/video symbol stream 190. The conversion module 186 may perform one or more of scrambling, encoding, puncturing, interleaving, data modulation (e.g., QAM, QPSK, 8-PSK, GMSK, FSK, etc.), domain conversion, and/or filtering to produce the mixed outbound data and image/video symbol stream 190.

In another operational mode, the conversion module 192 converts a mixed inbound voice and image/video symbol stream 200 into a mixed inbound voice and image/video signal. In this instance the communication device 50 may be receiving an image and/or video file that has an accompanying voice message. The conversion module 192 may perform one or more of descrambling, decoding, depuncturing, deinterleaving, data demodulation (e.g., QAM, QPSK, 8-PSK, GMSK, FSK, etc.), domain conversion, and/or filtering on the mixed outbound voice and image/video symbol stream 200. The separation module 196 separates the mixed inbound voice and image/video signal to produce the inbound voice signal 70 and the inbound image/video signal 94.

In yet another operational mode, the conversion module 194 converts a mixed inbound data and image/video symbol stream 202 into a mixed inbound data and image/video signal. In this instance the communication device 50 may be receiving an image and/or video file that has an accompanying data message. The conversion module 194 may perform one or more of descrambling, decoding, depuncturing, deinterleaving, data demodulation (e.g., QAM, QPSK, 8-PSK, GMSK, FSK, etc.), domain conversion, and/or filtering on the mixed outbound data and image/video symbol stream 202. The separation module 196 separates the mixed inbound data and image/video signal to produce the inbound data signal 82 and the inbound image/video signal 94.

Figure 8:
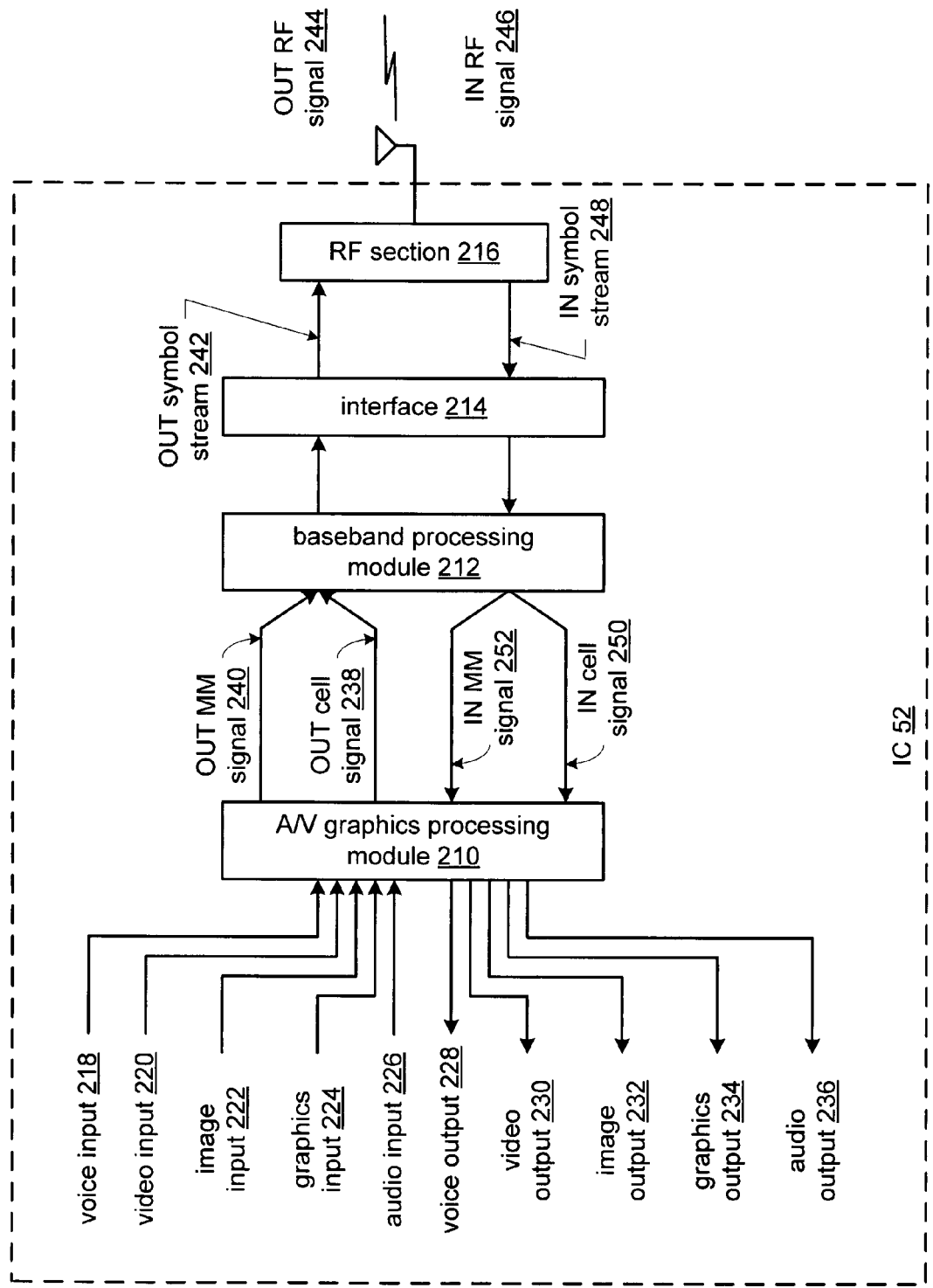
FIG. 8 is a schematic block diagram of another embodiment of an integrated circuit in accordance with the present invention.

FIG. 8 is a schematic block diagram of another embodiment of the integrated circuit 52 that includes an audio-video-graphics processing module 210, a baseband processing module 212, an interface module 214, and an RF section 216. The audio-video-graphics processing module 210 and the baseband processing module 212 may be separate processing modules and/or a shared processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIG. 8.

In this embodiment, the audio-video-graphics processing module 210 is coupled to produce one or more of an outbound cellular signal 238 and an outbound multimedia (e.g., video, image, graphics, audio, and/or text) signal 240 from at least one of a voice input 218, an audio input 226, a video input 220, an image input 222, and a graphics input 224. The audio-video-graphics processing module 210 is also coupled to produce at least one of a voice output 230, an audio output 236, a video output 230, an image output 232, and a graphics output 234 from one or more of an inbound cellular signal 250 and an inbound multimedia signal 252.

The baseband processing module 212 is coupled to convert the one or more of the outbound cellular signal 238 and the outbound multimedia signal 240 into an outbound symbol stream 242. The baseband processing 212 may use one or more of scrambling, encoding, puncturing, interleaving, data modulation (e.g., QAM, QPSK, 8-PSK, GMSK, FSK, etc.), domain conversion, and/or filtering in accordance with one or more protocols to produce the outbound symbol stream 242. The baseband processing module 212 is further coupled to convert an inbound symbol stream 248 into the one or more of the inbound cellular signal 250 and the inbound multimedia signal 252. The baseband processing module 212 may use one or more of descrambling, decoding, depuncturing, deinterleaving, data demodulation (e.g., QAM, QPSK, 8-PSK, GMSK, FSK, etc.), domain conversion, and/or filtering in accordance with one or more protocols on the inbound symbol stream 248 to produce the inbound cellular and/or multimedia signal 250 and/or 252. Note that the inbound and outbound cellular signals 238 and 250 include one or more of an inbound voice signal, inbound data, an outbound voice signal, and outbound data. Further note that text may be a form of graphics and that the multimedia signals may be stored in memory and subsequently retrieved as well as contemporaneously generated.

The RF section 216 is coupled to convert the outbound symbol stream 242 into an outbound RF signal 244 and to convert an inbound RF signal 246 into the inbound symbol stream 248. The interface module 214, which may be similar to interface module 56, is coupled to convey the inbound symbol stream 248 from the RF section 216 to the baseband processing module 212 and to convey the outbound symbol stream 242 from the baseband processing module 212 to the RF section 216.

In an embodiment of the RF section 216, the RF section 216 includes a first antenna interface coupled to a first antenna structure that transceives the inbound and outbound RF signals in a first frequency band when the inbound and outbound symbol streams correspond to the inbound and outbound cellular signals; a first low noise amplifier module coupled to amplify the inbound RF signal to produce an amplified inbound RF signal; a first down conversion module coupled to convert the amplified inbound RF signal into the inbound symbol stream in accordance with a first local oscillation; an up conversion module coupled to convert the outbound symbol stream into an up-converted signal in accordance with the first local oscillation; a power amplifier module coupled to amplify the up-converted signal to produce the outbound RF signal; a second antenna interface coupled to a second antenna structure that transceives the inbound and outbound RF signals in a second frequency band when the inbound and outbound symbol streams correspond to the inbound and outbound multimedia signals; a second low noise amplifier module coupled to the second antenna interface and to amplify the inbound RF signal to produce a second amplified inbound RF signal; a second down conversion module coupled to convert the second amplified inbound RF signal into the inbound symbol stream in accordance with a second local oscillation; a second up conversion module coupled to convert the outbound symbol stream into a second up-converted signal in accordance with the second local oscillation; and a second power amplifier module coupled to amplify the second up-converted signal to produce the outbound RF signal. A similar embodiment is shown in FIG. 3.

In an embodiment of the RF section 216, the RF section 216 includes an adjustable antenna interface coupled to an array of antennas that transceives the inbound and outbound RF signals in different frequency bands; an adjustable low noise amplifier module coupled to amplify the inbound RF signal to produce an amplified inbound RF signal; an adjustable down conversion module coupled to convert the amplified inbound RF signal into the inbound symbol stream in accordance with an adjustable local oscillation; an adjustable up conversion module coupled to convert the outbound symbol stream into an up-converted signal in accordance with the adjustable local oscillation; and an adjustable power amplifier module coupled to amplify the up-converted signal to produce the outbound RF signal. A similar embodiment is shown in FIG. 4.

In an embodiment of the audio-video-graphics processing module 210, the audio-video-graphics processing module 210 includes at least one of: an audio codec coupled to convert an outbound analog signal into the audio or voice input and to convert the audio or voice output into an inbound analog signal; a microphone circuit block coupled to generate the outbound analog signal; a speaker circuit block coupled to render the inbound analog signal audible; a video capture module coupled to a video capture circuit, wherein the video capture interface provides the video input; an image capture module coupled to an image capture circuit, wherein the image capture interface provides the image input; a display interface coupled to provide at least one of the video output, the image output, and the graphics output to a display; and a data input interface coupled to receive the graphics input from a data input circuit. Such components were discussed with reference to FIG. 5.

In another embodiment, the baseband processing module 212 and/or the audio-video-graphics processing module 210 includes at least one of: a television tuner circuit module coupled to process the inbound symbol stream into an inbound television video signal; a satellite receiver circuit module coupled to process the inbound symbol stream into an inbound satellite video signal; an image sensor circuit module coupled to convert a captured image into the outbound multimedia signal; a video compression/decompression module coupled to compress an outbound video signal of the outbound multimedia signal and to decompress an inbound video signal of the inbound multimedia signal; and an image compression/decompression coupled to compress an outbound image signal of the outbound multimedia signal and to decompress an inbound image signal of the inbound multimedia signal. Such components were discussed with reference to FIG. 6.

In yet another embodiment, the audio-video-graphics processing module 210 and/or the baseband processing module 212 is further coupled to perform at least one of: mixing an outbound voice signal with an outbound image/video signal to produce a mixed outbound voice and image/video signal; converting the mixed outbound voice and image/video signal into a mixed outbound voice and image/video symbol stream; converting a mixed inbound voice and image/video symbol stream into a mixed inbound voice and image/video signal; separating the mixed inbound voice and image/video signal to produce an inbound voice signal and an inbound image/video signal; mixing an outbound data signal with an outbound image/video signal to produce a mixed outbound data and image/video signal; converting the mixed outbound data and image/video signal into a mixed outbound data and image/video symbol stream; converting a mixed inbound data and image/video symbol stream into a mixed inbound data and image/video signal; and separating the mixed inbound data and image/video signal to produce an inbound data signal and an inbound image/video signal. A similar embodiment was presented in FIG. 7.

Figure 9:
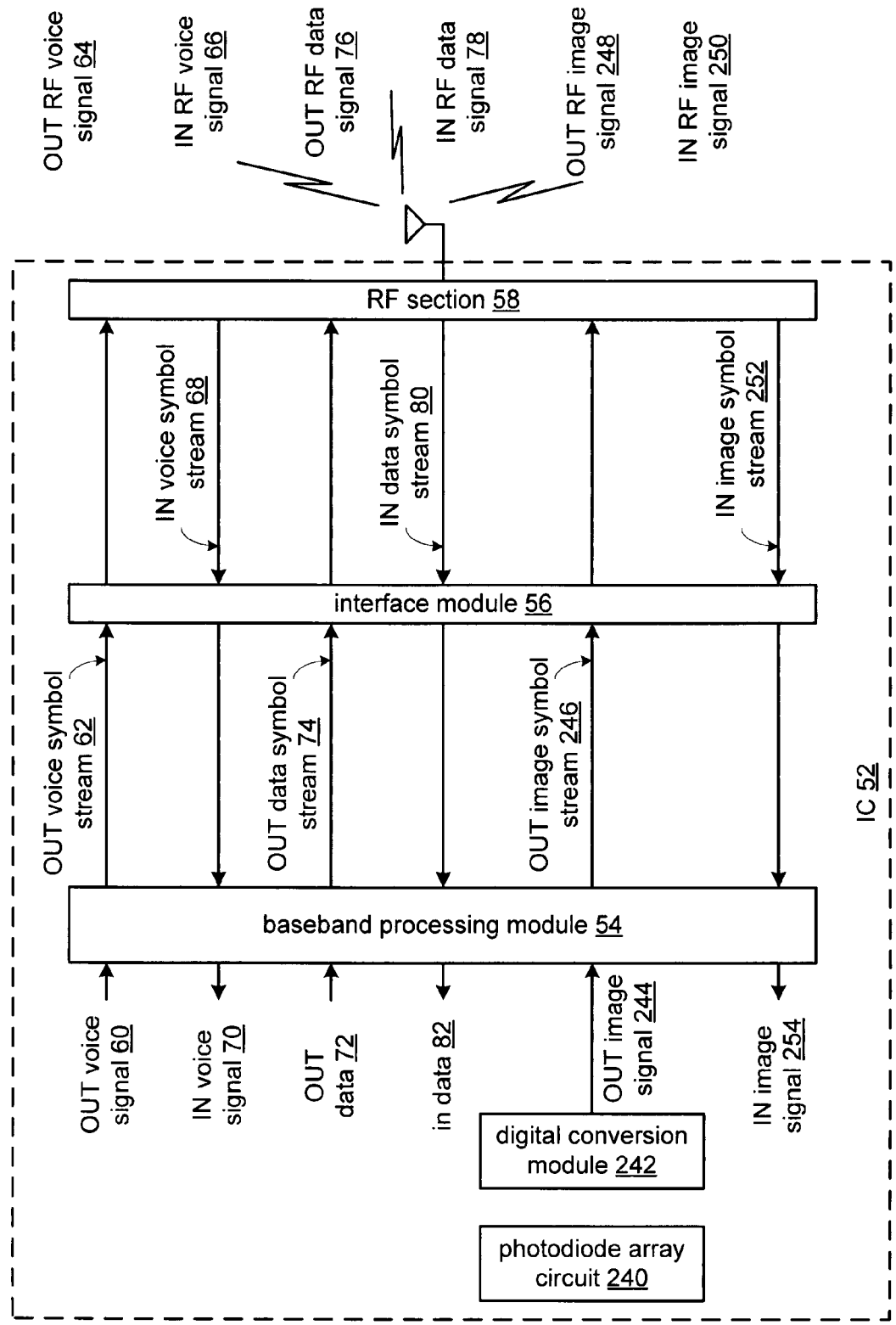
FIG. 9 is a schematic block diagram of another embodiment of an integrated circuit in accordance with the present invention.

FIG. 9 is a schematic block diagram of another embodiment of the integrated circuit 52 that includes the baseband processing module 54, the interface module 56, the RF section 58, a digital conversion module 242, and a photodiode array circuit 240. In this embodiment, the photodiode array circuit 240 is coupled to convert received light into an electrical image signal and the digital conversion module 242 is coupled to convert the electrical image signal into a digital image signal.

The baseband processing module 54 is coupled to convert an outbound voice signal 60 into an outbound voice symbol stream 62, convert an inbound voice symbol stream 68 into an inbound voice signal 70, convert outbound data 72 into an outbound data symbol stream 74, convert an inbound data symbol stream 80 into inbound data 82, and convert the digital image signal 244 into an outbound image symbol stream 246.

The RF section 58 is coupled to convert an inbound RF voice signal 66 into the inbound voice symbol stream 68, convert the outbound voice symbol stream 62 into an outbound RF voice signal 64, convert an inbound RF data signal 76 into the inbound data symbol stream 78, convert the outbound data symbol stream 74 into an outbound RF data signal 76, and convert the outbound image symbol stream 246 into an outbound RF image signal 248. Note that the conversion of the digital image signal 244 into the outbound RF image signal 248 may be done in accordance with one or more cellular protocols (e.g., EDGE, GPRS, etc.).

The RF section 58 is further coupled to convert an inbound RF image signal 250 into the inbound image symbol stream 252. The baseband processing module 54 is further coupled to convert an inbound image symbol stream 252 into inbound digital image signal 254. This may also be done in accordance with one or more cellular protocols.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
 a baseband processing module coupled to:
 convert an outbound voice signal into an outbound voice symbol stream;
 convert an inbound voice symbol stream into an inbound voice signal;
 convert outbound data into an outbound data symbol stream;
 convert an inbound data symbol stream into inbound data;
 convert outbound image/video data into an outbound image/video symbol stream; and
 convert an inbound image/video symbol stream into inbound image/video data;
 a radio frequency (RF) section coupled to:
 convert an inbound RF voice signal into the inbound voice symbol stream;
 convert the outbound voice symbol stream into an outbound RF voice signal;
 convert an inbound RF data signal into the inbound data symbol stream;
 convert the outbound data symbol stream into an outbound RF data signal;
 convert an inbound RF image/video signal into the inbound image/video symbol stream; and
 convert the outbound image/video symbol stream into an outbound RF image/video signal; and
 an interface module coupled to:
 convey the inbound voice symbol stream and the outbound voice symbol stream between the baseband processing module and the RF section;
 convey the inbound data symbol stream and the outbound data symbol stream between the baseband processing module and the RF section; and
 convey the inbound image/video symbol stream and the outbound image/video symbol stream between the baseband processing module and the RF section.

2. The IC of claim 1, wherein the RF section comprises:
 a first antenna interface coupled to a first antenna structure that transceives the inbound and outbound RF voice and data signals in a first frequency band;
 a first low noise amplifier module coupled to amplify the inbound RF voice signal or the inbound RF data signal to produce an amplified inbound RF voice or data signal;
 a first down conversion module coupled to convert the amplified inbound RF voice or data signal into the inbound data symbol stream or the inbound voice symbol stream in accordance with a first local oscillation;
 an up conversion module coupled to convert the outbound voice symbol stream or the outbound data symbol stream into an up-converted voice or data signal in accordance with the first local oscillation;
 a power amplifier module coupled to amplify the up-converted voice or data signal to produce the outbound RF voice signal or the outbound RF data signal;
 a second antenna interface coupled to a second antenna structure that receives the inbound RF image/video image signal in a second frequency band;

a second low noise amplifier module coupled to amplify the inbound RF image/video signal to produce an amplified inbound RF image/video signal; and a second down conversion module coupled to convert the amplified inbound RF image/video signal into the inbound image/video symbol stream in accordance with a second local oscillation.

3. The IC of claim 2, wherein the inbound RF image/video signal comprises at least one of:

a very high frequency (VHF) television broadcast signal;
a ultra high frequency (UHF) television broadcast signal;
a C-band satellite broadcast signal; and
a K-band satellite broadcast signal.

4. The IC of claim 1, wherein the RF section comprises:

an adjustable antenna interface coupled to an array of antennas that transceives the inbound and outbound RF voice signals, the inbound and outbound RF data signals, and the inbound and outbound RF image/video signals in different frequency bands;

an adjustable low noise amplifier module coupled to amplify the inbound RF voice signal, the inbound RF data signal, or the inbound RF image/video signal to produce an amplified inbound RF signal;

an adjustable down conversion module coupled to convert the amplified inbound RF signal into the inbound data symbol stream, the inbound voice symbol stream, or the inbound image/video symbol stream in accordance with an adjustable local oscillation;

an adjustable up conversion module coupled to convert the outbound voice symbol stream, the outbound data symbol stream, or the outbound image/video symbol stream into an up-converted signal in accordance with the adjustable local oscillation; and an adjustable power amplifier module coupled to amplify the up-converted signal to produce the outbound RF voice signal, the outbound RF data signal, or the outbound RF image/video signal.

5. The IC of claim 1 further comprises at least one of:

an audio codec coupled to convert an outbound analog signal into the outbound voice signal and to convert the inbound voice signal into an inbound analog signal;

a microphone circuit block coupled to generate the outbound analog signal;

a speaker circuit block coupled to render the inbound analog signal audible;

a video capture module coupled to provide an outbound video signal to the baseband processing module;

an image capture module coupled to provide an outbound image signal to the baseband processing module;

a display interface coupled to provide at least one of the inbound image/video signal, the outbound image/video signal, the outbound data signal, and the inbound data signal to a display; and a data input interface coupled to provide the outbound data signal from a data input circuit to the baseband processing module.

6. The IC of claim 5 further comprises:

a display controller coupled to the baseband processing module and to the display interface, wherein the display controller controls displaying of the at least one of the inbound image/video signal, the outbound image/video signal, the outbound data signal, and the inbound data signal on the display.

7. The IC of claim 1, wherein the baseband processing module comprises at least one of:

a television tuner circuit module coupled to process the inbound image/video symbol stream into an inbound television image/video signal;

a satellite receiver circuit module coupled to process the inbound image/video symbol stream into an inbound satellite image/video signal;

an image sensor circuit module coupled to convert a captured image into the outbound image/video signal;

a video compression/decompression module coupled to compress an outbound video signal of the outbound image/video signal and to decompress an inbound video signal of the inbound image/video signal; and an image compression/decompression module coupled to compress an outbound image signal of the outbound image/video signal and to decompress an inbound image signal of the inbound image/video signal.

8. The IC of claim 1, wherein the baseband processing module is further coupled to perform at least one of:

mixing the outbound voice signal with the outbound image/video signal to produce a mixed outbound voice and image/video signal;

converting the mixed outbound voice and image/video signal into a mixed outbound voice and image/video symbol stream;

converting a mixed inbound voice and image/video symbol stream into a mixed inbound voice and image/video signal;

separating the mixed inbound voice and image/video signal to produce the inbound voice signal and the inbound image/video signal;

mixing the outbound data signal with the outbound image/video signal to produce a mixed outbound data and image/video signal;

converting the mixed outbound data and image/video signal into a mixed outbound data and image/video symbol stream;

converting a mixed inbound data and image/video symbol stream into a mixed inbound data and image/video signal; and separating the mixed inbound data and image/video signal to produce the inbound data signal and the inbound image/video signal.

9. An integrated circuit (IC) comprises:

an audio-video-graphics processing module, including respective inputs for receiving a voice input, an audio input, a video input, an image input, and a graphics input and including respective outputs for outputting a voice output, an audio output, a video output, an image output, and a graphics output, coupled to:

produce one or more of an outbound cellular signal and an outbound multimedia signal from at least one of the voice input, the audio input, the video input, the image input, and the graphics input; and produce at least one of the voice output, the audio output, the video output, the image output, and the graphics output from one or more of an inbound cellular signal and an inbound multimedia signal;

a baseband processing module coupled to:

convert the one or more of the outbound cellular signal and the outbound multimedia signal into an outbound symbol stream; and convert an inbound symbol stream into the one or more of the inbound cellular signal and the inbound multimedia signal;

a radio frequency (RF) section coupled to:

convert the outbound symbol stream into an outbound RF signal; and
convert an inbound RF signal into the inbound symbol stream; and
an interface module coupled to:
convey the inbound symbol stream from the RF section to the baseband processing module; and
convey the outbound symbol stream from the baseband processing module to the RF section.

10. The IC of claim 9, wherein the inbound and outbound cellular signals comprise:
an inbound voice signal;
inbound data;
an outbound voice signal; and
outbound data.

11. The IC of claim 10 further comprises:
the inbound and outbound voice signals being formatted in accordance with one or more cellular communication protocols.

12. The IC of claim 9, wherein the inbound and outbound multimedia signals comprise at least some of:
an inbound graphics signal;
an outbound graphics signal;
an inbound video signal;
an outbound video signal;
an inbound image signal;
an outbound image signal;
an inbound audio signal;
an outbound audio signal;
an inbound text message; and
an outbound text message.

13. The IC of claim 9, wherein the RF section comprises:
a first antenna interface coupled to a first antenna structure that transceives the inbound and outbound RF signals in a first frequency band when the inbound and outbound symbol streams correspond to the inbound and outbound cellular signals;
a first low noise amplifier module coupled to amplify the inbound RF signal to produce an amplified inbound RF signal;
a first down conversion module coupled to convert the amplified inbound RF signal into the inbound symbol stream in accordance with a first local oscillation;
an up conversion module coupled to convert the outbound symbol stream into an up-converted signal in accordance with the first local oscillation;
a power amplifier module coupled to amplify the up-converted signal to produce the outbound RF signal;
a second antenna interface coupled to a second antenna structure that transceives the inbound and outbound RF signals in a second frequency band when the inbound and outbound symbol streams correspond to the inbound and outbound multimedia signals;
a second low noise amplifier module coupled to the second antenna interface and to amplify the inbound RF signal to produce a second amplified inbound RF signal;
a second down conversion module coupled to convert the second amplified inbound RF signal into the inbound symbol stream in accordance with a second local oscillation;
a second up conversion module coupled to convert the outbound symbol stream into a second up-converted signal in accordance with the second local oscillation; and
a second power amplifier module coupled to amplify the second up-converted signal to produce the outbound RF signal.

14. The IC of claim 9, wherein the RF section comprises:
an adjustable antenna interface coupled to an array of antennas that transceives the inbound and outbound RF signals in different frequency bands;
an adjustable low noise amplifier module coupled to amplify the inbound RF signal to produce an amplified inbound RF signal;
an adjustable down conversion module coupled to convert the amplified inbound RF signal into the inbound symbol stream in accordance with an adjustable local oscillation;
an adjustable up conversion module coupled to convert the outbound symbol stream into an up-converted signal in accordance with the adjustable local oscillation; and
an adjustable power amplifier module coupled to amplify the up-converted signal to produce the outbound RF signal.

15. The IC of claim 9, wherein the audio-video-graphics processing module comprises at least one of:
an audio codec coupled to convert an outbound analog signal into the audio or voice input and to convert the audio or voice output into an inbound analog signal;
a microphone circuit block coupled to generate the outbound analog signal;
a speaker circuit block coupled to render the inbound analog signal audible;
a video capture module coupled to a video capture circuit, wherein the video capture interface provides the video input;
an image capture module coupled to an image capture circuit, wherein the image capture interface provides the image input;
a display interface coupled to provide at least one of the video output, the image output, and the graphics output to a display; and
a data input interface coupled to receive the graphics input from a data input circuit.

16. The IC of claim 9, wherein at least one of the baseband processing module and the audio-video-graphics processing module comprises at least one of:
a television tuner circuit module coupled to process the inbound symbol stream into an inbound television video signal;
a satellite receiver circuit module coupled to process the inbound symbol stream into an inbound satellite video signal;
an image sensor circuit module coupled to convert a captured image into the outbound multimedia signal;
a video compression/decompression module coupled to compress an outbound video signal of the outbound multimedia signal and to decompress an inbound video signal of the inbound multimedia signal; and
an image compression/decompression coupled to compress an outbound image signal of the outbound multimedia signal and to decompress an inbound image signal of the inbound multimedia signal.

17. The IC of claim 9, wherein at least one of the audio-video-graphics processing module and the baseband processing module is further coupled to perform at least one of:
mixing an outbound voice signal with an outbound image/video signal to produce a mixed outbound voice and image/video signal;
converting the mixed outbound voice and image/video signal into a mixed outbound voice and image/video symbol stream;

converting a mixed inbound voice and image/video symbol stream into a mixed inbound voice and image/video signal;

separating the mixed inbound voice and image/video signal to produce an inbound voice signal and an inbound image/video signal;

mixing an outbound data signal with an outbound image/video signal to produce a mixed outbound data and image/video signal;

converting the mixed outbound data and image/video signal into a mixed outbound data and image/video symbol stream;

converting a mixed inbound data and image/video symbol stream into a mixed inbound data and image/video signal; and separating the mixed inbound data and image/video signal to produce an inbound data signal and an inbound image/video signal.

18. An integrated circuit (IC) comprises:

a photodiode array circuit coupled to convert received light into an electrical image signal;

a digital conversion module coupled to convert the electrical image signal into a digital image signal;

a baseband processing module coupled to:
 convert an outbound voice signal into an outbound voice symbol stream;
 convert an inbound voice symbol stream into an inbound voice signal;
 convert outbound data into an outbound data symbol stream;
 convert an inbound data symbol stream into inbound data; and
 convert the digital image signal into an outbound image symbol stream;

a radio frequency (RF) section coupled to:
 convert an inbound RF voice signal into the inbound voice symbol stream;
 convert the outbound voice symbol stream into an outbound RF voice signal;
 convert an inbound RF data signal into the inbound data symbol stream;
 convert the outbound data symbol stream into an outbound RF data signal; and
 convert the outbound image symbol stream into an outbound RF image signal.

19. The IC of claim 18 further comprises:

the RF section further coupled to convert an inbound RF image signal into the inbound image symbol stream; and the baseband processing module further coupled to convert an inbound image symbol stream into inbound digital image signal.

20. The IC of claim 18, wherein:

the IC being implemented within a laptop computer, a personal computer (PC), a personal digital assistant (PDA), or a cell phone.

* * * * *